(12) United States Patent
Lee

(10) Patent No.: US 10,568,310 B2
(45) Date of Patent: Feb. 25, 2020

(54) SPINNING REEL

(71) Applicant: HAIBAO FISHING TACKLE CO., LTD., Zhejiang (CN)

(72) Inventor: Wen-Hsiang Lee, Taichung (TW)

(73) Assignee: HAIBAO FISHING TACKLE CO., LTD., Zhejiang (CN)

( * ) Notice: Subject to any disclaimer, the term of this patent is extended or adjusted under 35 U.S.C. 154(b) by 0 days.

(21) Appl. No.: 16/418,026

(22) Filed: May 21, 2019

(65) Prior Publication Data
US 2019/0357512 A1    Nov. 28, 2019

(30) Foreign Application Priority Data

May 25, 2018 (CN) .......................... 2018 1 0514961

(51) Int. Cl.
*A01K 89/01* (2006.01)
(52) U.S. Cl.
CPC ................................ *A01K 89/0114* (2013.01)
(58) Field of Classification Search
CPC ................................................ A01K 89/0114
See application file for complete search history.

(56) References Cited

U.S. PATENT DOCUMENTS

| 5,415,358 | A | * | 5/1995 | Yamaguchi | ........ | A01K 89/0114 |
| | | | | | | 242/241 |
| 5,662,285 | A | * | 9/1997 | Hashimoto | ........ | A01K 89/0114 |
| | | | | | | 242/241 |
| 5,775,612 | A | * | 7/1998 | Hashimoto | ........ | A01K 89/0114 |
| | | | | | | 242/241 |
| 6,176,446 | B1 | * | 1/2001 | Sato | ............... | A01K 89/011221 |
| | | | | | | 242/319 |

* cited by examiner

*Primary Examiner* — Emmanuel M Marcelo
(74) *Attorney, Agent, or Firm* — Christensen O'Connor Johnson Kindness PLLC

(57) ABSTRACT

A spinning reel includes a reel body, a crank mounted to the reel body, a main shaft, a tubular worm, a rotor, a spool unit, a rotary shaft, a slider block, a cam mechanism, and a guiding unit. The cam mechanism is disposed between the rotary shaft and the slider block to provide a camming action for translating rotation of the rotary shaft into linear reciprocating motion of the slider block relative to the rotary shaft. A guiding sleeve of the guiding unit is disposed between the rotary shaft and the slider block to guide and stabilize the linear reciprocating motion of the slider block.

9 Claims, 9 Drawing Sheets

SPINNING REEL

CROSS-REFERENCE TO RELATED APPLICATION

This application claims priority from Chinese invention patent application No. 201810514961.2, filed on May 25, 2018.

FIELD

The disclosure relates to a spinning reel, more particularly to a spinning reel with a guiding unit for guiding and stabilizing linear reciprocating motion of a slider block relative to a rotary shaft.

BACKGROUND

Taiwanese patent publication No. 1389639, corresponding to U.S. counterpart U.S. Pat. No. 7,537,178 B2 discloses a conventional spinning reel which includes a reel unit, a rotation transmission mechanism, a handle assembly, a rotor, a spool shaft, an oscillating mechanism, and a spool. The reel unit includes a reel body that has a first opening, and a first lid member that covers the first opening. The rotation transmission mechanism includes a master gear shaft that is rotatably mounted to the reel unit, and a master gear that is disposed on the master gear shaft integrally rotatably about a first shaft axis. The reel body includes a first rotation support portion that rotatably supports the master gear shaft on a master gear side of the spool shaft. The first lid member includes a second rotation support portion that rotatably supports the master gear shaft on a first lid member side of the master gear.

Another conventional spinning reel shown in FIG. 1 includes a reel body 1, a drive unit 2 mounted to the reel body 1, an oscillating unit 3 mounted inside the reel body 1, a rotor 4 mounted forwardly of the reel body 1, and a spool 5 mounted forwardly of the rotor 4.

The drive unit 2 includes a crank 201 which is rotatably mounted on the reel body 1, a main shaft 202 which is coupled to be driven by the crank 201 to rotate, an output wheel 203 which is mounted on the main shaft 202, and a tubular worm 204 which is in mesh with the output wheel 203.

The oscillating unit 3 includes a worm member 301 which is in mesh with the tubular worm 204, a rotary shaft 302 which is coupled to the worm member 301, a guiding shaft 303 which is disposed parallel to the rotary shaft 302, a slider block 304 which is slidably mounted on the guiding shaft 303, and a spool rod 305 which is coupled to the slider block 304 and which extends through the tubular worm 204 to connect the spool 5. A camming groove 306 is formed in an outer peripheral surface of the rotary shaft 302, and a cam follower 307 is mounted to the slider block 304 and engages the camming groove 306 to provide a camming action.

When the main shaft 202 is driven by the crank 201 to rotate, by virtue of the camming action, the slider block 304 is guided by the guiding shaft 303 to linearly reciprocate to thereby permit linear reciprocating motion of the spool rod 305 and the spool 5. Therefore, a fishing line (not shown) guided by the rotor 4 may evenly wind onto the spool 5.

However, the provision of the guiding shaft 303 may undesirably increase the volume of the spinning reel. In addition, the caroming action may cause wobble of the slider block 304 which may adversely affect the linear reciprocating motion of the spool rod 305 and the spool 5.

SUMMARY

Therefore, an object of the disclosure is to provide a novel spinning reel which may have a reduced volume, and which is less likely to wobble during operation.

According to the disclosure, a spinning reel for fishing includes a reel body, a crank, a main shaft, a tubular worm, a rotor, a spool unit, a rotary shaft, a slider block, a cam mechanism, and a guiding unit. The crank is mounted rotatably on an outer surface of the reel body. The main shaft is disposed inside the reel body, and is coupled to be driven by the crank to rotate about a first axis. The tubular worm is coupled to be driven by the main shaft to rotate about a second axis. The rotor is coupled to rotate with the tubular worm about the second axis. The spool unit includes a spool member and a spool rod which extends along the second axis through the tubular worm to terminate at a first rod end and a second rod end. The second rod end is coupled to permit the spool member to move with the spool rod. The rotary shaft is coupled to be driven by the tubular worm to rotate about a third axis which is parallel to and offset from the second axis. The slider block includes a first slider segment and a second slider segment. The first slider segment is coupled to the first rod end to permit the spool unit to move with the slider block along the second axis. The second slider segment has an inner peripheral surface which defines a through bore that extends along the third axis for passage of the rotary shaft. The cam mechanism includes a cam groove which is formed in an outer peripheral surface of the rotary shaft, and a cam follower which is disposed in the through bore to engage the cam groove to provide a camming action such that when the rotary shaft is driven to rotate, by virtue of the camming action, the second slider segment is permitted to linearly reciprocate relative to the rotary shaft along the third axis, to thereby allow the first slider segment and the spool unit to linearly reciprocate relative to the rotor along the second axis. The guiding unit includes a guiding sleeve which is disposed between the rotary shaft and the second slider segment of the slider block, and which is coupled to the second slider segment to move with the slider block and to prevent the second slider segment from rotating with the rotary shaft so as to guide and stabilize linear reciprocating motion of the slider block relative to the rotary shaft.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Figure 1:
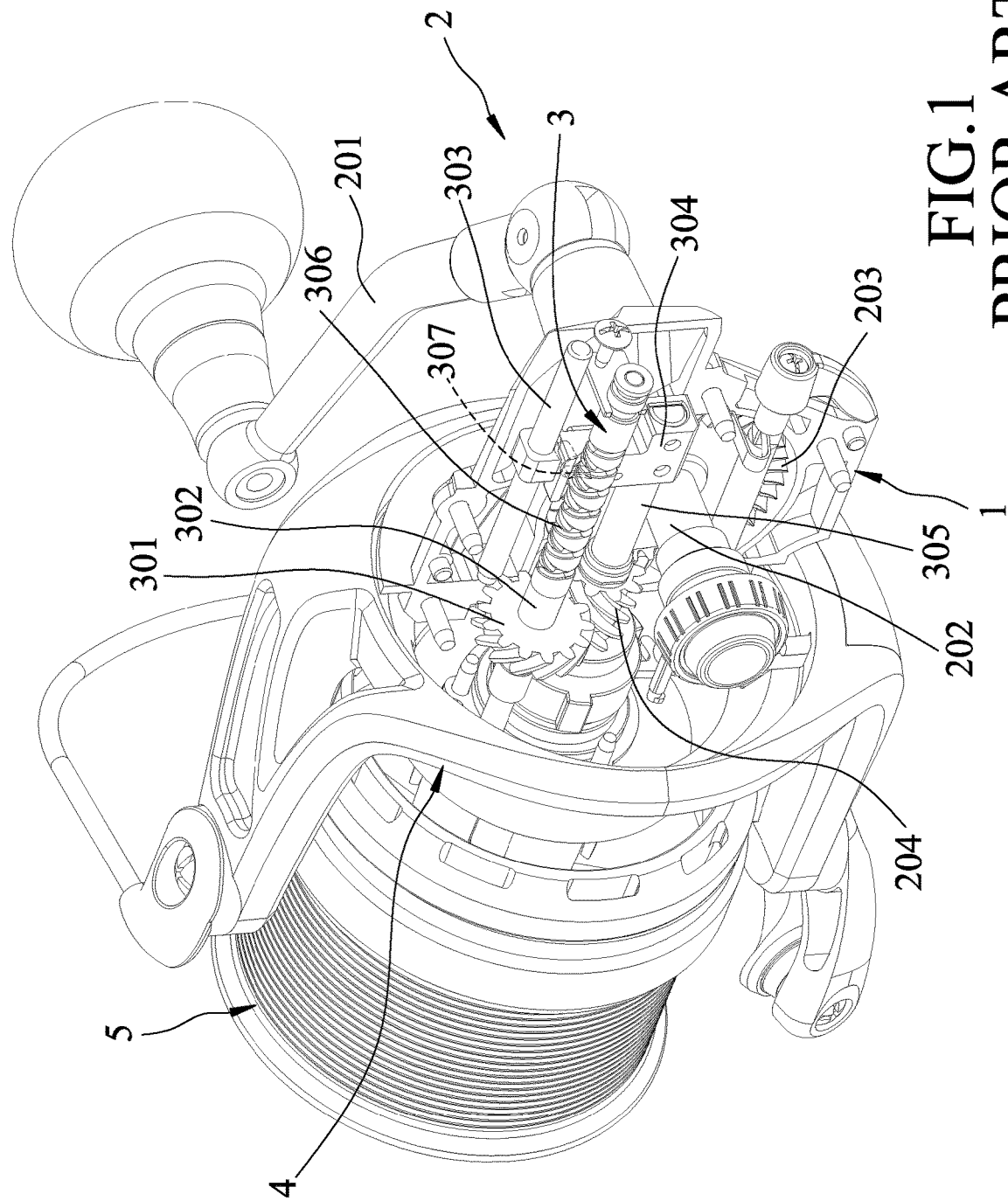
FIG. 1 is a partially omitted perspective view of a conventional spinning reel.

To aid in describing the disclosure, directional terms may be used in the specification and claims to describe portions of the present disclosure (e.g., front, rear, left, right, top, bottom, etc.). These directional definitions are intended to merely assist in describing and claiming the disclosure and are not intended to limit the disclosure in any way.

Referring to FIGS. 2 to 6, a spinning reel for fishing according to an embodiment of the disclosure is shown to include a reel body 10, a drive unit 20, an oscillating unit 30, a guiding unit 40, a rotor 50, and a spool unit 60.

The drive unit 20 is mounted to the reel body 10, and includes a crank 21, a main shaft 22, and a tubular worm 24.

The crank 21 is mounted rotatably on an outer surface of the reel body 10. The main shaft 22 is disposed inside the reel body 10, and is coupled to be driven by the crank 21 to rotate about a first axis (L1) which extends in a left-to-right direction (X).

Figure 2:
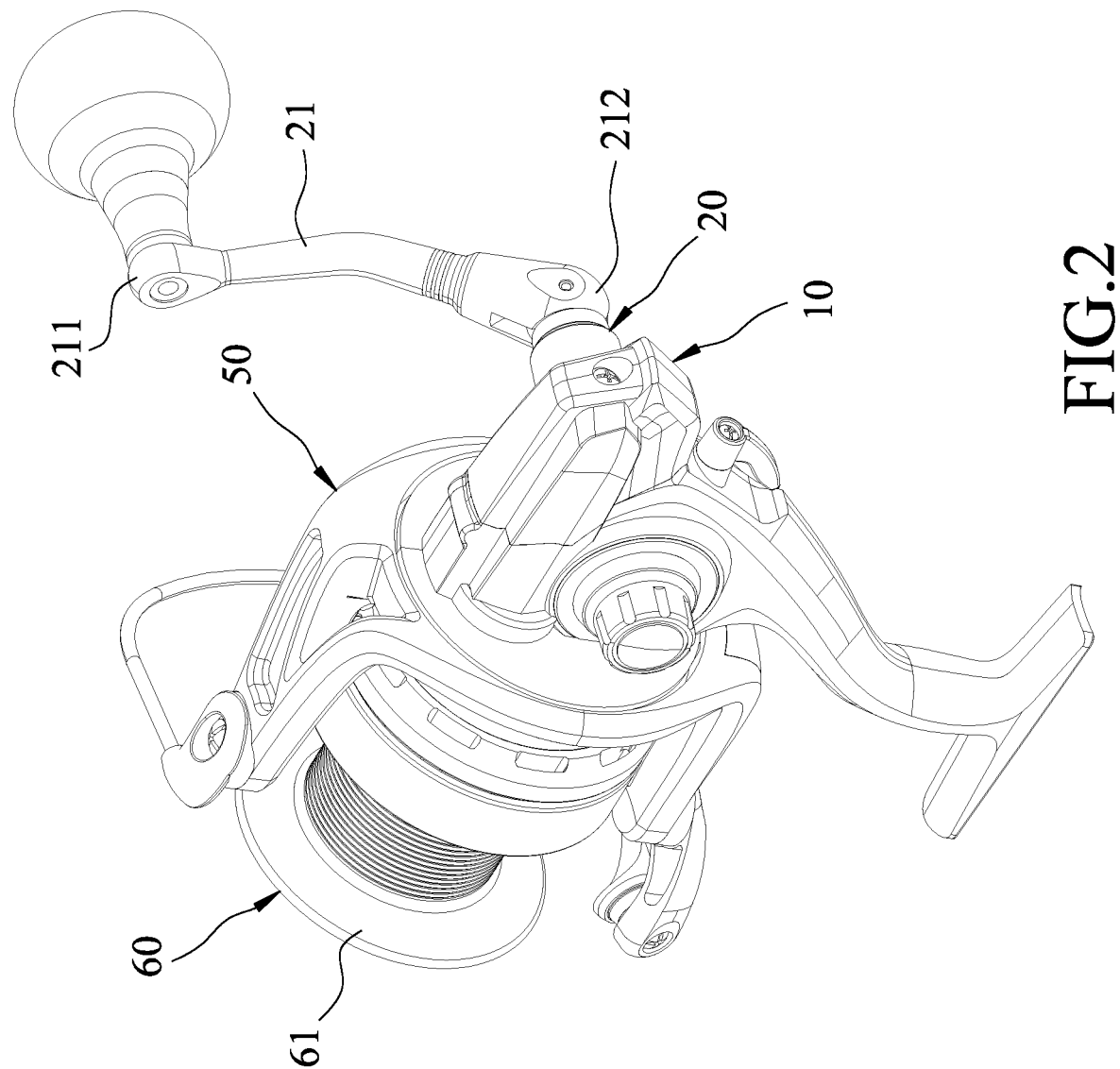
FIG. 2 is a perspective view of a spinning reel according to an embodiment of the disclosure.
Figure 3:
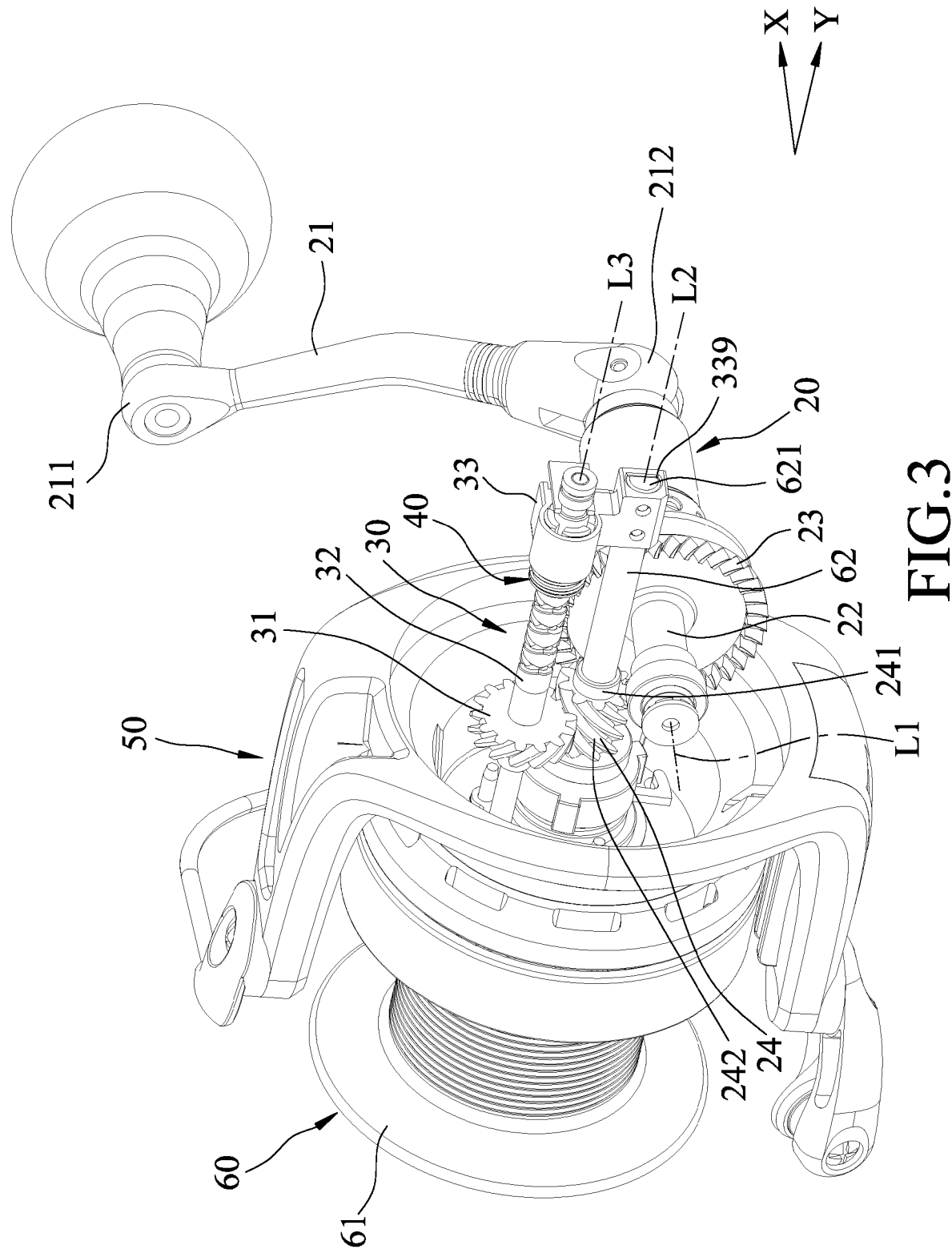
FIG. 3 is similar to FIG. 2 but omitting certain elements shown in FIG. 2.

In an embodiment shown in FIGS. 2 and 3, the crank 21 is a hand-powered crank and has a drive end 211 and a crank end 212 which is opposite to the drive end 211, and which is coupled to a right end 221 of the main shaft 22 (shown in FIG. 5) so as to permit a circular motion of the drive end 211 to be translated into rotation of the main shaft 22 to thereby drive the main shaft 22.

Figure 5:
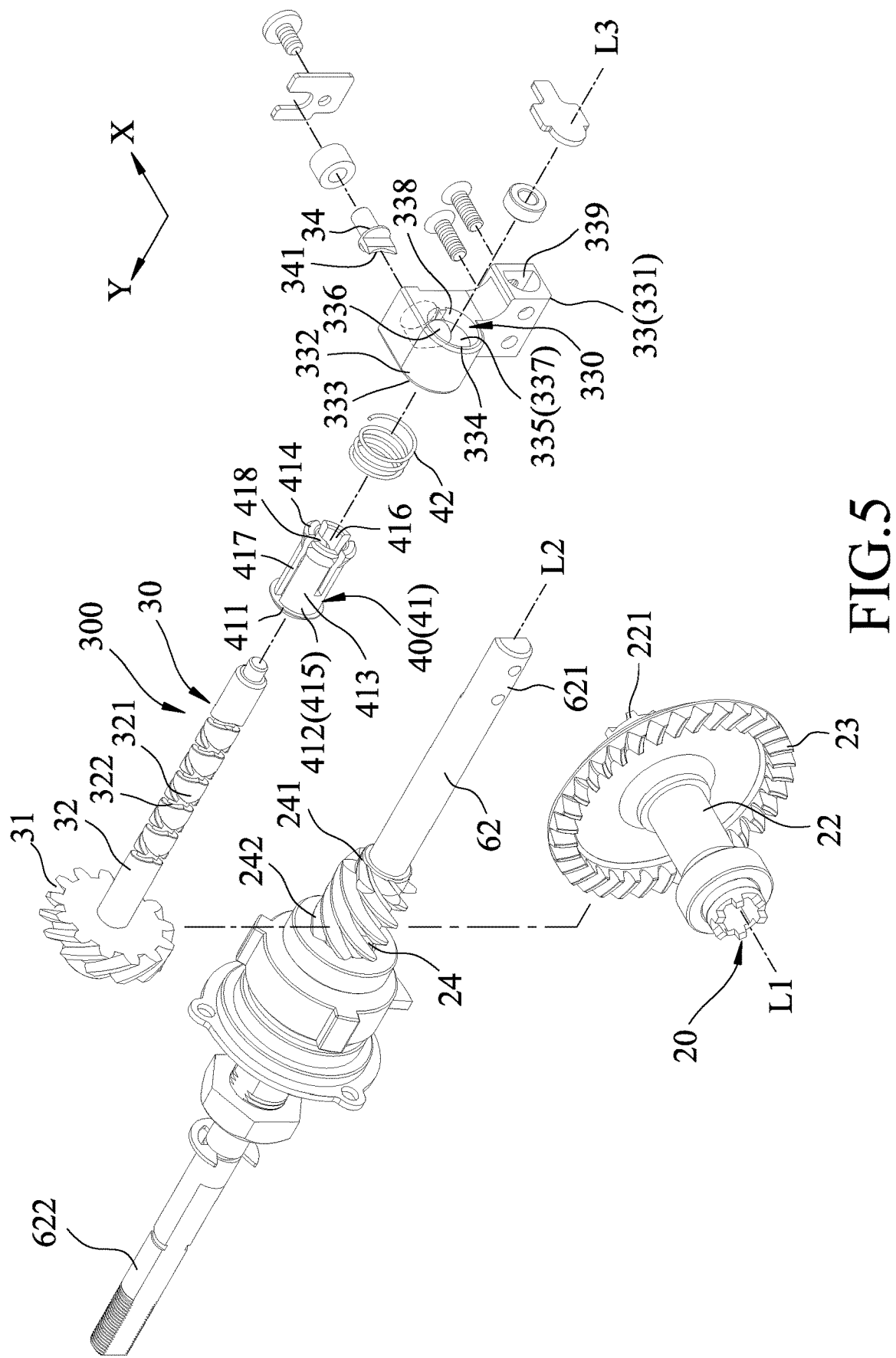
FIG. 5 is an exploded perspective view of FIG. 4.

The tubular worm 24 is coupled to be driven by the main shaft 22 to rotate about a second axis (L2) which is transverse to the first axis (L1) and which extends in a front-to-rear direction (Y). As shown in FIGS. 3 and 5, the tubular worm 24 has a rear tubular end 241 and a front tubular end 242 which is opposite to the front tubular end 241 along the second axis (L2).

Figure 4:
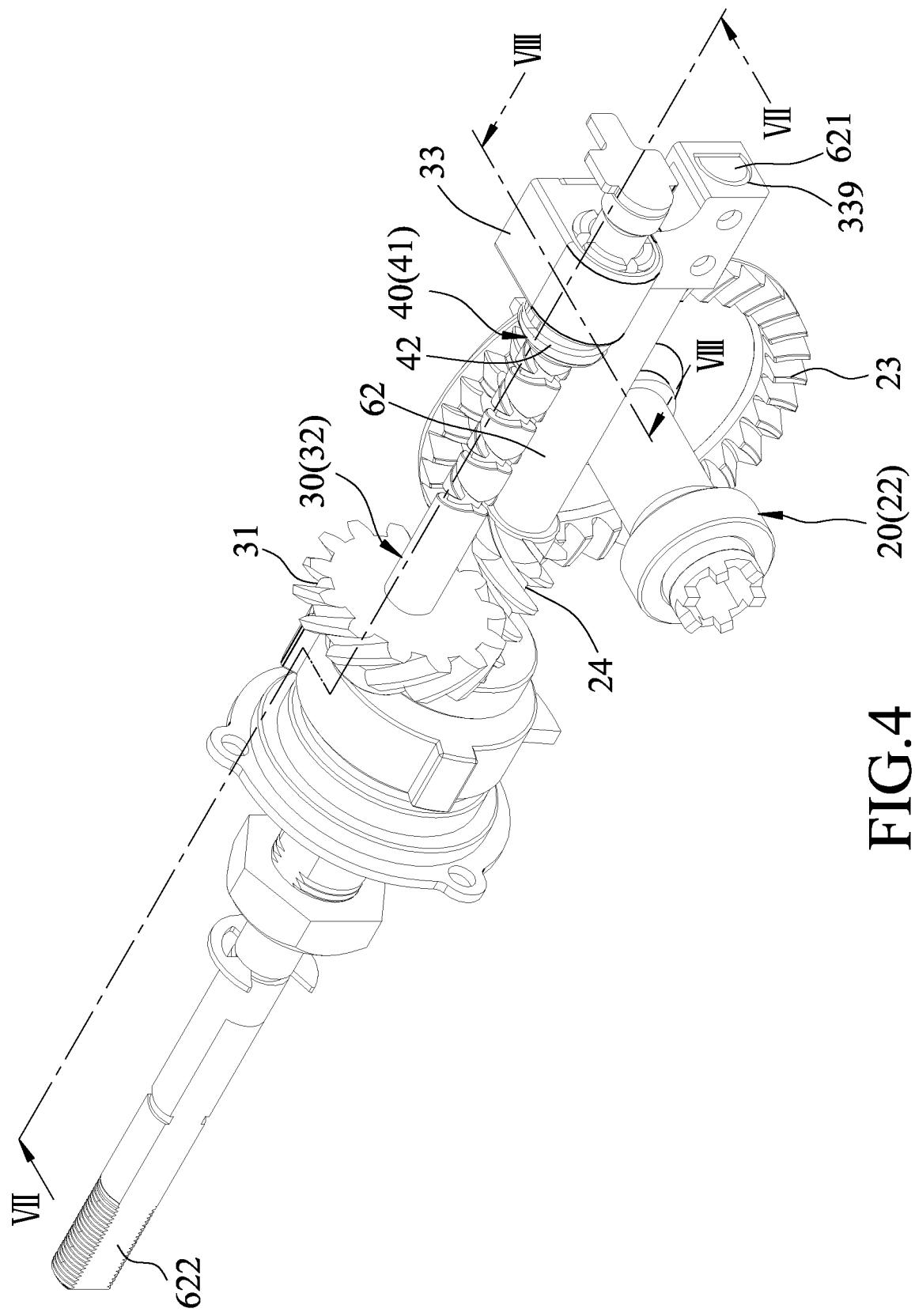
FIG. 4 is a perspective view illustrating elements inside the spinning reel shown in FIG. 2.

In an embodiment shown in FIGS. 3 to 5, the drive unit 2 may further include an output wheel 23 which is mounted on the main shaft 22 to rotate with the main shaft 22 about the first axis (L1), and which is configured to mesh with the tubular worm 24 so as to permit the tubular worm 24 to be driven by the main shaft 22.

The rotor 50 is disposed forwardly of the reel body 10, and is coupled to rotate with the tubular worm 24 about the second axis (L2). In an embodiment shown in FIGS. 3 and 5, the rotor 50 is coupled to the front tubular end 242 of the tubular worm 24 to permit the rotor 50 to rotate with the tubular worm 24 about the second axis (L2).

The spool unit 60 includes a spool member 61 and a spool rod 62. The spool member 61 is disposed forwardly of the rotor 50. The spool rod 62 extends along the second axis (L2) through the tubular worm 24 to terminate at a first rod end 621 and a second rod end 622. The second rod end 622 is coupled to the spool member 61 to permit the spool member 61 to move with the spool rod 62.

Figure 9:
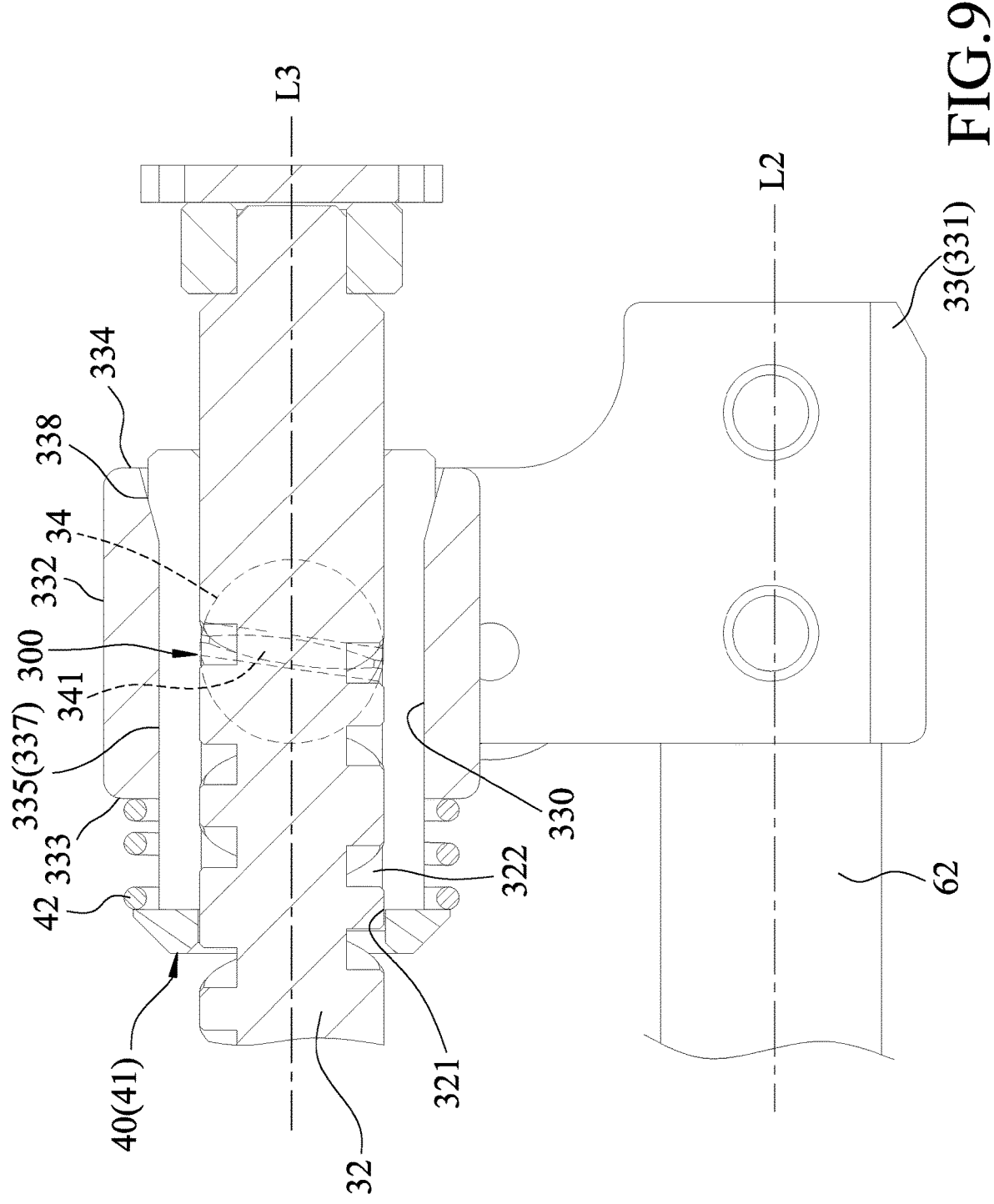
FIG. 9 is a fragmentary partially enlarged view of FIG. 7.

The oscillating unit 30 includes a rotary shaft 32, a slider block 33, and a cam mechanism 300 (see FIGS. 5 and 9).

The rotary shaft 32 is coupled to be driven by the tubular worm 24 to rotate about a third axis (L3) which is parallel to and offset from the second axis (L2).

The slider block 33 includes a first slider segment 331 and a second slider segment 332.

Figure 8:
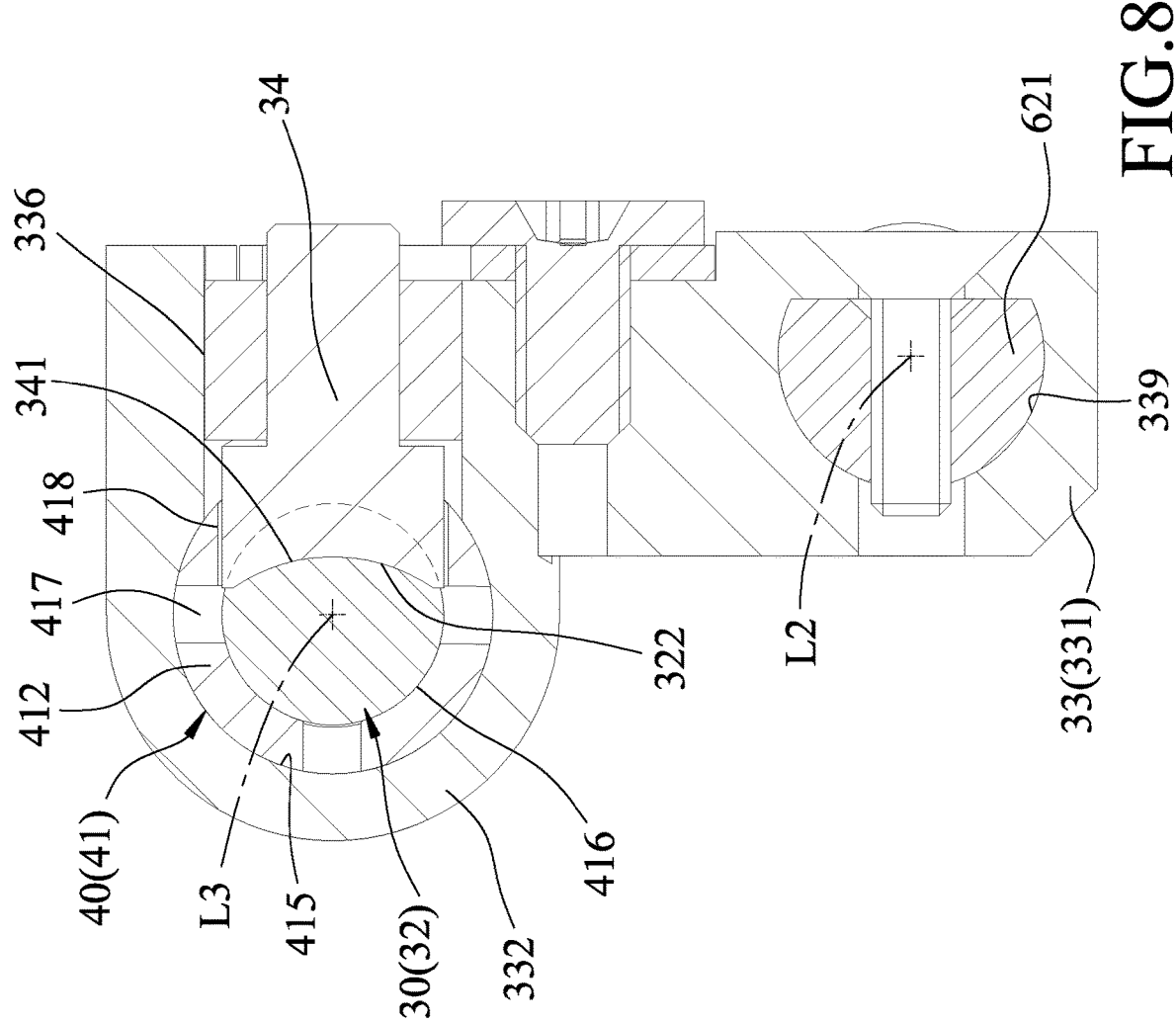
FIG. 8 is a cross-sectional view taken along line VIII-VIII of FIG. 4.

The first slider segment 331 is coupled to the first rod end 621 to permit the spool unit 60 to move with the slider block 33 along the second axis (L2). In an embodiment shown in FIGS. 3, 5, and 8, the first slider segment 331 is formed with a spline hole 339, and the first rod end 621 of the spool rod 62 is secured and fitted into the spline hole 339.

The second slider segment 332 has an inner peripheral surface 335 defining a through bore 330 which extends from a front side surface 333 to a rear side surface 334 of the second slider segment 332 along the third axis (L3) for passage of the rotary shaft 32.

In an embodiment shown in FIG. 5, the second slider segment 332 has a radial hole 336 extending in a radial direction relative to the third axis (L3) to be in spatial communication with the through bore 330.

The cam mechanism 300 includes a cam groove 322 and a cam follower 34. The cam groove 322 is formed in an outer peripheral surface 321 of the rotary shaft 32. The cam follower 34 is disposed in the through bore 330 to engage the cam groove 322 to provide a camming action. When the rotary shaft 32 is driven to rotate, by virtue of the camming action, the second slider segment 332 is permitted to linearly reciprocate relative to the rotary shaft 32 along the third axis (L3), to thereby allow the first slider segment 331 and the spool unit 60 to linearly reciprocate relative to the rotor 50 along the second axis (L2).

In an embodiment shown in FIG. 5, the cam groove 322 is an endless spiral groove. The cam follower 34 is rotatably mounted in the radial hole 336, and has a follower end 341 which extends into the through bore 330 to engage the endless spiral groove 322.

In an embodiment shown in FIGS. 3 to 5, the oscillating unit 30 may further include a worm member 31 which is mounted on the rotary shaft 32 to permit the rotary shaft 32 to rotate therewith, and which is configured to mesh with the tubular worm 24 so as to permit the rotary shaft 32 to be driven by the tubular worm 24.

The guiding unit 40 includes a guiding sleeve 41. The guiding sleeve 41 is slidably sleeved on the rotary shaft 32 to be disposed between the rotary shaft 32 and the second slider segment 332 of the slider block 33. The guiding sleeve 41 is coupled to the second slider segment 332 to move with the slider block 33 and to prevent the second slider segment 332 from rotating with the rotary shaft 32 so as to guide and stabilize linear reciprocating motion of the slider block 33 relative to the rotary shaft 32.

Figure 6:
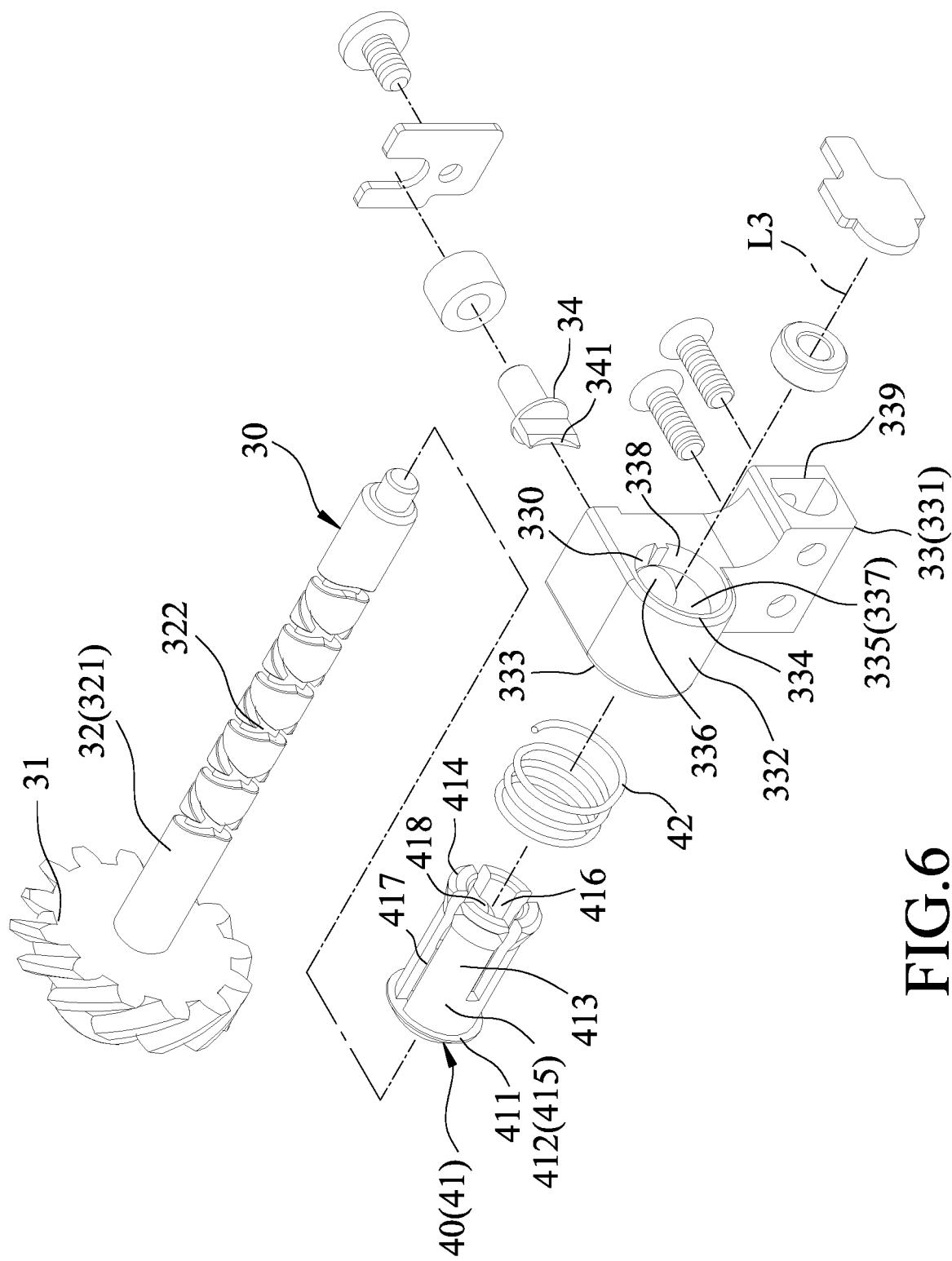
FIG. 6 is an enlarged view of FIG. 5 in which some elements shown in FIG. 5 are omitted.
Figure 7:
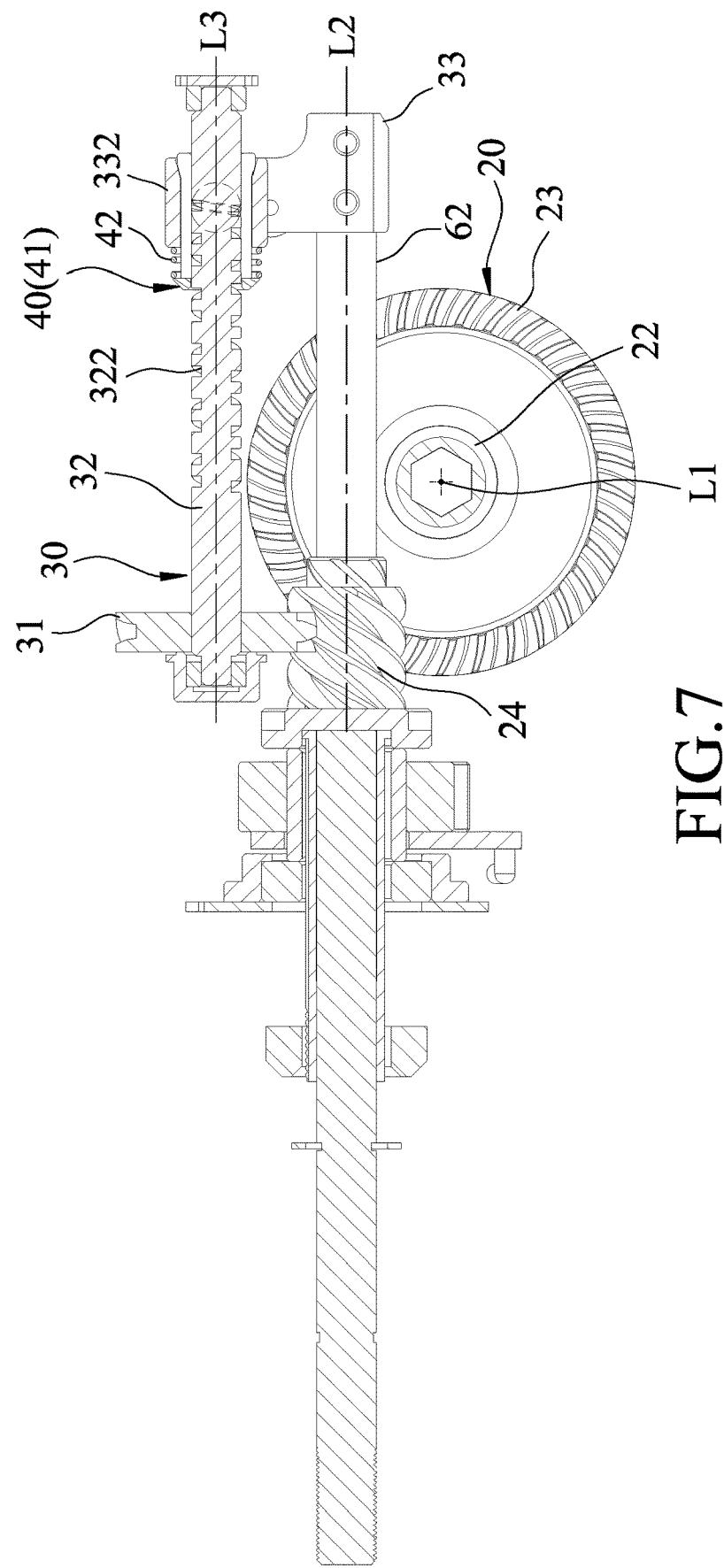
FIG. 7 is a cross-sectional view taken along line VII-VII of FIG. 4.

In an embodiment shown in FIGS. 4 to 6, the guiding sleeve 41 has a front enlarged end 411 and a sleeve body 412, and the guiding unit 40 further includes a biasing spring 42.

The front enlarged end 411 is disposed forwardly of the front side surface 333 of the second slider segment 332. The sleeve body 412 is retained inside the through bore 330, and has an access hole 418 which extends through outer and inner peripheral surfaces 415, 416 of the sleeve body 412 to permit access of the cam follower 34 to the cam groove 322. In an embodiment shown in FIG. 9, the follower end 341 extends through the access hole 418 to engage the endless spiral groove 322.

The biasing spring 42 is sleeved on the sleeve body 412 to be disposed between the front enlarged end 411 and the front side surface 333 of the second slider segment 332 to bias the front enlarged end 411 away from the second slider segment 332 so as to permit the guiding sleeve 41 to guide and stabilize the linear reciprocating motion of the slider block 33. In an embodiment, the biasing spring 42 is a compressed spring.

In an embodiment shown in FIGS. 5 and 6, the sleeve body 412 of the guiding sleeve 41 includes a middle segment 413, a rear end segment 414, and a plurality of slits 417.

The middle segment 413 is disposed in the through bore 330 of the second slider segment 332, and has the access hole 418. The rear end segment 414 is flared outwardly and rearwardly from the middle segment 413 to have a radial dimension slightly larger than that of the through bore 330. Each of the slits 417 extends from the rear end segment 414 into the middle segment 413. The slits 417 are angularly displaced from each other about the third axis (L3) so as to permit the rear end segment 414 to be squeezed into frictional engagement with the inner peripheral surface 335 of the second slider segment 332 to thereby retain the sleeve body 412 inside the through bore 330.

In an embodiment shown in FIGS. 5, 6, 7, and 9, the inner peripheral surface 335 of the second slider segment 332 includes a main surface region 337 and a rear marginal region 338 which is converged toward the main surface region 337 so as to permit and facilitate the rear end segment 414 of the guide sleeve 41 to be squeezed into frictional engagement with the rear marginal region 338 in the through bore 330.

Because the guiding sleeve 41 for guiding the linear reciprocating motion of the slider block 33 is coaxial with the rotary shaft 32, the spinning reel of the disclosure may have a reduced volume. In addition, because the guiding sleeve 41 with the slits 417 is radially deformable, there is substantially no clearance between the guiding sleeve 41 and the rotary shaft 32 or between the guiding sleeve 41 and the second slider segment 332. As such, the spinning reel of the disclosure is less likely to wobble during operation.

In the description above, for the purposes of explanation, numerous specific details have been set forth in order to provide a thorough understanding of the embodiment (s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that, one or more features or specific details from one embodiment may be practiced together with one or more features or specific details from another embodiment, where appropriate, in the practice of the disclosure.

While the disclosure has been described in connection with what is (are) considered the exemplary embodiment (s), it is understood that this disclosure is not limited to the disclosed embodiment (s) but is intended to cover various arrangements included within the spirit and scope of the broadest interpretation so as to encompass all such modifications and equivalent arrangements.

What is claimed is:

1. A spinning reel for fishing, comprising:
   a reel body;
   a crank mounted rotatably on an outer surface of said reel body;
   a main shaft disposed inside said reel body, and coupled to be driven by said crank to rotate about a first axis;
   a tubular worm coupled to be driven by said main shaft to rotate about a second axis;
   a rotor coupled to rotate with said tubular worm about the second axis;
   a spool unit including a spool member and a spool rod which extends along the second axis through said tubular worm to terminate at a first rod end and a second rod end, said second rod end being coupled to permit said spool member to move with said spool rod;
   a rotary shaft coupled to be driven by said tubular worm to rotate about a third axis which is parallel to and offset from the second axis;
   a slider block including
      a first slider segment coupled to said first rod end to permit said spool unit to move with said slider block along the second axis, and
      a second slider segment having an inner peripheral surface which defines a through bore that extends along the third axis for passage of said rotary shaft;
   a cam mechanism including a cam groove which is formed in an outer peripheral surface of said rotary shaft, and a cam follower which is disposed in said through bore to engage said cam groove to provide a camming action such that when said rotary shaft is driven to rotate, by virtue of the camming action, said second slider segment is permitted to linearly reciprocate relative to said rotary shaft along the third axis, to thereby allow said first slider segment and said spool unit to linearly reciprocate relative to said rotor along the second axis; and
   a guiding unit including a guiding sleeve which is disposed between said rotary shaft and said second slider segment of said slider block, and which is coupled to said second slider segment to move with said slider block and to prevent said second slider segment from rotating with said rotary shaft so as to guide and stabilize linear reciprocating motion of said slider block relative to the rotary shaft.

2. The spinning reel according to claim 1, wherein
   the first axis extends in a left-to-right direction;
   the second axis extends in a front-to-rear direction;
   said rotor is disposed forwardly of said reel body; and
   said spool member is disposed forwardly of said rotor.

3. The spinning reel according to claim 2, wherein
   said guiding sleeve has
      a front enlarged end disposed forwardly of said. second slider segment, and
      a sleeve body which is retained inside said through bore, and which has an access hole configured to permit access of said cam follower to said cam groove; and
   said guiding unit further including a biasing spring which is sleeved on said sleeve body to be disposed between said front enlarged end and said second slider segment to bias said front enlarged end away from said second slider segment so as to permit said guiding sleeve to guide and stabilize the linear reciprocating motion of said slider block.

4. The spinning reel according to claim 3, wherein said sleeve body of said guiding sleeve includes
   a middle segment disposed in said through bore of said second slider segment, and having said access hole,
   a rear end segment which is flared outwardly and rearwardly from said middle segment to have a radial dimension slightly larger than that of said through bore, and
   a plurality of slits each extending from said rear end segment into said middle segment, said slits being angularly displaced from each other about the third axis so as to permit said rear end segment to be squeezed into frictional engagement with said inner peripheral surface of said second slider segment to hereby retain said sleeve body inside said through bore.

5. The spinning reel according to claim 4, wherein said inner peripheral surface of said second slider segment includes a main surface region and a rear marginal region which is converged toward said main surface region so as to permit and facilitate said rear end segment of said guide sleeve to be squeezed into frictional engagement with said inner peripheral surface in said through bore.

6. The spinning reel according to claim 2, wherein said tubular worm has a rear tubular end and a front tubular end which is opposite to said front tubular end along the second axis, and which is coupled to said rotor to permit said rotor to rotate with said tubular worm about the second axis.

7. The spinning reel according to claim 1, wherein
said second slider segment has a radial hole extending in a radial direction relative to the third axis to be in spatial communication with said through bore;
said cam groove is an endless spiral groove; and
said cam follower is rotatably mounted in said radial hole, and has a follower end which extends into said through bore to engage said endless spiral groove.

8. The spinning reel according to claim 1, wherein said first slider segment is formed with a spline hole, and said first rod end of said spool rod is secured and fitted into said spline hole.

9. The spinning reel according to claim 1, further comprising:
an output wheel which is mounted on said main shaft to rotate with said main shaft about the first axis, and which is configured to mesh with said tubular worm so as to permit said tubular worm to be driven by said main shaft; and
a worm member which is mounted on said rotary shaft to permit said rotary shaft to rotate therewith, and which is configured to mesh with said tubular worm so as to permit said rotary shaft to be driven by said tubular worm.

\* \* \* \* \*